United States Patent [19]

Brugel

[11] Patent Number: 5,436,079
[45] Date of Patent: Jul. 25, 1995

[54] GASOLINE RESISTANT COATED MULTILAYER PLASTIC SUBSTRATE

[75] Inventor: Edward G. Brugel, Wilmington, Del.

[73] Assignee: E. I. Du Pont de Nemours and Company, Wilmington, Del.

[21] Appl. No.: 239,064

[22] Filed: May 6, 1994

[51] Int. Cl.⁶ .................... B32B 27/06; B32B 27/08
[52] U.S. Cl. ..................... 428/483; 428/502;
428/516; 428/910; 428/519; 428/412;
428/476.9; 428/413; 428/424.6; 428/520;
428/424.8
[58] Field of Search ............... 428/483, 502, 516, 910, 428/519

[56] References Cited

U.S. PATENT DOCUMENTS 5,162,156 11/1992 Troughton, Jr. et al. .......... 428/460

FOREIGN PATENT DOCUMENTS 58-091725 5/1983 Japan.
60-149635 8/1985 Japan.
3-047881 2/1991 Japan.
4-72847 11/1992 Japan.

*Primary Examiner*—P. C. Sluby
*Attorney, Agent, or Firm*—Marilyn H. Bromels

[57] ABSTRACT

Curable multilayer coated plastic substrates are provided having enhanced gasoline resistance and topcoat adhesion. The plastic is coated with a primer layer which is either a chlorosulfonated grafted polypropylene polymer or a mixture of a chlorinated grafted propylene polymer and a chlorosulfonated olefin polymer and which is free of crosslinking agents for the chlorosulfonated polymer. The primer layer is coated with a coating layer having free hydroxyl, primary amino, or secondary amino groups capable of reacting with the chlorosulfonyl groups of the primer layer.

10 Claims, No Drawings

GASOLINE RESISTANT COATED MULTILAYER PLASTIC SUBSTRATE

BACKGROUND OF THE INVENTION

This invention relates to coated multilayer plastic substrates having an excellent balance of adhesion and gasoline resistance.

It is often difficult to coat plastic substrates because the inherent crystallinity of such polymers prevents adequate bonding to many coating compositions. This is particularly true when the plastic substrate is also non-polar, as in the case of polyolefin substrates. Primers based on polypropylene graft copolymers have been used with some success to enhance adhesion, but, unfortunately, the adhesion is still inadequate for some applications. In particular, the coating compositions of the prior art have not provided an adequate combination of adhesion, weatherability, and gasoline resistance. Such properties are desirable when the coated substrate is designed to be used in an outdoor setting in which it is exposed to the elements, especially in automotive assemblies. For example, in Japanese Patent Application Publication Kokoku 4-72847, a coated polyolefin substrate is disclosed wherein a primer layer composed of a crosslinked chlorosulfonated, carboxylated polyolefin is used. Although this provides some degree of enhanced adhesion and gasoline resistance, it is inadequate for certain applications which require superior adhesion performance.

SUMMARY OF THE INVENTION

The present invention is directed to a method for preparing coated plastic substrates which are particularly gasoline and weather resistant, wherein the coating is strongly bonded to the plastic substrate. In addition, the invention is directed to the curable multilayer coated plastic substrates used in the process. Specifically, the invention is directed to a process for producing a multilayer coated polyolefin substrate having a high degree of resistance to gasoline which comprises A) preparing a primer composition, substantially free of crosslinking agents for chlorosulfonated polymers, by mixing a carrier liquid or dispersing agent with a chlorosulfonated polypropylene homopolymer or copolymer having a sulfur content of at least 0.5 weight percent and a chlorine content of 10–45 weight percent which has been graft-modified with a grafting component selected from the group consisting of alpha, beta-unsaturated dicarboxylic acids and anhydrides thereof;

B) applying the primer composition to a plastic substrate;

C) evaporating any carrier liquid present to form a primer layer on the substrate wherein substantially all the chlorosulfonyl groups of the chlorosulfonated polymer or polymers present are in the uncrosslinked state;

D) applying to the primer layer a solution or dispersion in a carrier liquid of a polymer having free hydroxyl, primary amino, or secondary amino moieties;

E) evaporating any carrier liquid present to form a coating layer; and

F) subjecting the coated primed polyolefin substrate to conditions effective to form covalent crosslinks between the primer layer and the coating layer.

In an alternative embodiment of the invention, a coated plastic substrate is similarly prepared using a primer composition, substantially free of crosslinking agents for chlorosulfonated polymers, which comprises a carrier liquid or dispersing agent and a blend of i) a chlorosulfonated olefin polymer having a sulfur content of at least 0.5 weight percent and a chlorine content of 20–65 weight percent and ii) a chlorinated polypropylene, free of chlorosulfonyl groups, having a chlorine content of 20–55 weight percent, which has been graft-modified with a grafting agent selected from the group consisting of alpha, beta-unsaturated dicarboxylic acids and anhydrides thereof; wherein component i) is present in an amount of 5–50 parts per 100 parts combined i) and ii), and component ii) is present in an amount of 50–95 parts per 100 parts combined i) and ii).

In addition, the invention is directed to curable multilayer substrate compositions wherein a reactive primer layer is interposed between the plastic substrate and the coating layer. The primer layer may be either a chlorosulfonated polypropylene graft polymer or a blend of a chlorinated polypropylene graft copolymer and a chlorosulfonated olefin polymer.

When the primer layer is a chlorosulfonated polypropylene graft copolymer, the curable multilayer coated substrate comprises A) a first plastic substrate layer;

B) a second layer, in contact with the plastic layer and substantially free of crosslinking agents for chlorosulfonated olefin polymers, which comprises a chlorosulfonated polypropylene homopolymer or copolymer having a sulfur content of at least 0.5 weight percent and a chlorine content of 10–45 weight percent which has been graft-modified with a grafting agent selected from the group consisting of alpha, beta-unsaturated dicarboxylic acids and anhydrides thereof; and C) a third layer, in contact with the second layer, comprising a polymer having free hydroxyl, primary amino or secondary amino moieties.

When the primer layer is a blend of a chlorosulfonated olefin polymer and a chlorinated polypropylene graft copolymer, the curable multilayer coated substrate comprises A) a first plastic substrate layer;

B) a second layer in contact with the plastic layer and substantially free of crosslinking agents for chlorosulfonated olefin polymers, which comprises a blend of i) a chlorosulfonated olefin polymer having a sulfur content of at least 0.5 weight percent and a chlorine content of 20–65 weight percent and ii) a chlorinated polypropylene, free of chlorosulfonyl groups, having a chlorine content of 20–55 weight percent, which has been graft-modified with a grafting agent selected from the group consisting of alpha, beta-unsaturated dicarboxylic acids and anhydrides thereof; wherein component i) is present in an amount of 5–50 parts per 100 parts combined i) and ii), and component ii) is present in an amount of 50–95 parts per 100 parts combined i) and ii); and C) a third layer, in contact with the second layer, comprising a polymer having free hydroxyl, primary amino, or secondary amino moieties.

DETAILED DESCRIPTION OF THE INVENTION

The process of the present invention involves a method for preparing multilayer coated plastic substrates wherein the coating layer exhibits excellent adhesion to the plastic layer, particularly when exposed to gasoline for long periods of time. This enhanced resistance to fuel compositions is believed to be due to the interlayer crosslinking of primer layer and coating layer which is a particular feature of the present invention. The interlayer crosslinking provides an integrated interpolymer network which protects the integrity of the laminate in a much more effective manner than if either the primer layer or coating layer is independently crosslinked.

The plastic substrate layer which is coated using the process of the present invention may include any type of crystalline plastic polymer. For example, the polymer may be a polar polymer such as a polyamide, polyester, polyurethane, polyacrylate, polycarbonate, polyoxymethylene, ethylene vinyl acetate copolymer, ethylene acrylic acid copolymer, or ethylene methacrylic acid copolymer. The plastic may also be a non-polar polymer, such as polyethylene, polypropylene, an ethylene propylene copolymer, and ethylene propylene diene copolymer or a thermoplastic polyolefin blend, such as an ethylene propylene/polypropylene TPO (thermoplastic olefin). Preferably, the plastic substrate is polypropylene or an ethylene propylene TPO (thermoplastic olefin) because these substrates are the type which are generally used in compositions wherein gasoline resistance is of most significance.

The reactive component which is present in the primer layer in the process of the present invention is either a chlorosulfonated polypropylene graft copolymer or a blend of a chlorinated polypropylene graft copolymer and a chlorosulfonated olefin copolymer. Thus, although it is necessary that a chlorosulfonated olefin polymer be present to provide the reactive groups necessary for interlayer curing, it is also necessary that a graft-modified polypropylene resin be present in the primer layer composition as well. This condition may be satisfied by utilizing a chlorosulfonated graft-modified polypropylene polymer in the primer composition or by utilizing a blend of a chlorinated graft-modified polypropylene and a chlorosulfonated olefin polymer. In this latter embodiment, the chlorosulfonated olefin polymer may be a graft copolymer or it may be non-grafted. Further, if a blend is utilized, the chlorosulfonated olefin polymer should be present in an amount of 5–50 parts per 100 parts combined chlorinated and chlorosulfonated polymer, and the chlorinated grafted polypropylene component should be present in an amount of 50–95 parts per 100 parts combined chlorinated and chlorosulfonated polymer. Preferably, 60–75 parts of the chlorosulfonated polymer will be present per 100 parts combined chlorinated and chlorosulfonated polymer. The chlorinated and chlorosulfonated polymers may have weight average molecular weights of from as low as 5,000 to as high as 200,000.

The chlorosulfonated polymers may be prepared by chlorosulfonating a base resin which is either a grafted or non-grafted olefin polymer base resin. The non-grafted olefin polymer base resins may be homopolymers of $C_2$–$C_8$ alpha monoolefins, copolymers of ethylene and at least one ethylenically unsaturated monomer selected from the group consisting of $C_3$–$C_{10}$ alpha monoolefins, $C_1$–$C_{12}$ alkyl esters of unsaturated $C_3$–$C_{20}$ monocarboxylic acids, unsaturated $C_3$–$C_{20}$ mono- or dicarboxylic acids, and vinyl esters of saturated $C_2$–$C_{18}$ carboxylic acids. The graft copolymer base resins are reaction products of an alpha-olefin polymer and a grafting agent. The alpha-olefin polymer may be either a $C_2$–$C_8$ alpha-olefin homopolymer or it may be a copolymer of two or more $C_2$–$C_8$ alpha-olefins. Examples of homopolymers are polyethylene and polypropylene. Examples of suitable copolymers include ethylene/propylene copolymers, ethylene/1-butene copolymers, ethylene/4-methyl-1-pentene copolymers, ethylene/1-hexene copolymers, ethylene/1-butene/1-octene copolymers, ethylene/1-decene copolymers, ethylene/4-ethyl-1-hexene copolymers, and ethylene/4-ethyl-1-octene copolymers. Polypropylene is the preferred homopolymer, while among the copolymers, ethylene/butene polymers are preferred. The grafting agent is selected from the group consisting of alpha, beta-unsaturated dicarboxylic acids and their anhydrides. Examples of such grafting agents include maleic acid, fumaric acid, iraconic acid, maleic anhydride, itaconic anhydride, and substituted maleic anhydrides, such as dimethylmaleic anhydride, 2,3-dichloromaleic anhydride, and 2-carbomethoxymaleic anhydride. Preferred acids and anhydrides each contain 4–6 carbon atoms. The most preferred carboxylic acids are maleic acid and fumaric acid, while maleic anhydride is the most preferred anhydride grafting agent. The grafted olefin polymer base resins may contain from about 0.2 to 10 weight percent units of the grafting agent. Preferably, no greater than 4 weight percent grafted units are present, and most preferably, 0.5 to 2 weight percent grafted units are present.

Chlorosulfonation may be effected by reaction of the grafted or non-grafted base resin with a chlorosulfonating agent at temperatures of about 50°–150° C. in a solvent substantially inert to chlorination, such as carbon tetrachloride, chloroform, fluorobenzene, or chlorofluorobenzene. The chlorosulfonation reaction is promoted by means of a free radical initiator such as an organic peroxide, an organic hydroperoxide, or an aliphatic azo compound. The chlorosulfonation reaction may be carried out as a batch or continuous process.

When the reactive component of the primer layer is a blend, a chlorinated grafted propylene polymer is a necessary component. The chlorinated grafted polypropylene component may be prepared by solution chlorination of a graft-modified polypropylene homopolymer or propylene/alpha-olefin copolymer in the presence of a free radical catalyst in a solvent which is inert to chlorination. Such solvents include carbon tetrachloride, chloroform, fluorobenzene, and chlorofluorobenzene. The chlorinated grafted polypropylene base resins are polypropylene polymers which have been grafted with an alpha, beta-unsaturated dicarboxylic acid or an anhydride of an alpha, beta-unsaturated anhydride. The grafting agents which are suitable are those which can be used to prepare the above-described chlorosulfonated grafted olefin polymers. Maleic acid and fumaric acid are preferred unsaturated acid grafting agents and maleic anhydride is a preferred anhydride-containing grafting agent.

The chlorosulfonated olefin polymers which form the reactive components of the primer composition contain 10–65 weight percent chlorine, preferably 20–45 weight percent chlorine and least 0.5 weight percent sulfur, generally 0.5–6 weight percent sulfur, and preferably 0.5–2 weight percent sulfur. If the chlorosulfonated olefin polymer is a grafted chlorosulfonated polypropylene, it is preferable that it contain 10–45 weight percent chlorine. The chlorinated grafted polypropylene polymers of the blend compositions used in the primer compositions contain 10–55 weight percent chlorine, preferably 20–30 weight percent chlorine.

The primer composition may also contain various additives such as pigments, coalescing agents, and dispersing agents. It must, however, be free of crosslinking agents for the chlorosulfonated olefin polymers because intralayer crosslinking will not fulfill the objectives of the invention. It is desirable to obtain a high level of interlayer crosslinking, so that a coating which is highly impervious to gasoline can be obtained. Addition of crosslinking agents to the primer layer composition defeats this purpose and results in poorer adhesion and unacceptably shortens pot life.

The polymer present in the coating layer which forms the third layer of the multilayer substrate is a polymer which is capable of chemical reaction with the chlorosulfonyl groups of the chlorosulfonated olefin polymer present in the primer layer. The chemical reaction between the reactive groups of the polymer of the primer and the polymer of the coating layer results in formation of covalent interlayer crosslinks. It is believed that the formation of the polymeric network is what causes the enhanced resistance to gasoline and overall improvement in adhesion of the coating to the plastic substrate which is exhibited in the coated multilayer substrates. The polymers suitable for use in the coating layer contain free hydroxyl, free primary amino, or free secondary amino functionalities. Such moieties react rapidly with chlorosulfonyl groups to form crosslinks. Examples of such polymers include hydroxyl-rich polyurethanes, especially acrylic polyurethanes, amine-rich polyureas, hydroxyl-rich polyesters, acrylic polyesters, polyester melamine resins, epoxy polyamines, and epoxy polyamides. Generally, the primer polymer is applied in a solution in combination with other polymers and additives. Particularly useful compositions include hydroxyl-rich polyurethane/melamine compositions, mixtures of polyesters and isocyanates, mixtures of hydroxyl rich polyurethanes and blocked isocyanates, mixtures of acrylic polymers and melamine resins, mixtures of polyesters, isocyanates and melamine resins, mixtures of hydroxyacrylic polymers and isocyanates, mixtures of polyesters and isocyanates, mixtures of polyethers and isocyanates, and mixtures of hydroxyl-rich polyurethanes and blocked urethanes. Most preferred are polyester melamine resins.

The coating layer composition may also include various additives, such as antioxidants, UV light stabilizers, pigments, drying agents, dispersing agents, and catalysts.

In the process of the present invention, the plastic substrate is coated with a mixture of the primer layer polymer or polymers and any additives in a carrier. The polymers may be high molecular weight materials, or they may be lower molecular weight pre-polymers or oligomers. The carrier may be a solvent for the polymer component or a liquid which disperses the components. If the polymer is of extremely low molecular weight, a carrier may not be necessary. Any carrier liquid present is then removed by evaporation, generally at ambient temperatures. The coating layer composition is then applied. Generally the coating layer composition is dissolved in an organic solvent, but the process of the present invention also contemplates the use of aqueous dispersions of the coating compositions. The carrier liquid is then removed by evaporation, generally at ambient temperature and the assembly is cured by exposure to conditions which result in the formation of interlayer crosslinks. Generally, this will involve heating the assembly to a temperature of from 60°–120° C. At temperatures below about 20° C. the reaction is very slow and at temperatures above 120° C. undesirable deformation of the plastic substrate may occur.

The cured multilayer substrates are useful as automotive bumpers, wheel covers, air bag door covers, dashboards, garage doors and window shutters. They are particularly suited for automotive exterior parts because they exhibit an excellent combination of adhesion, weatherability, and gasoline resistance.

The invention is further illustrated by the following embodiments wherein all parts are by weight unless otherwise specified.

EXAMPLES

Comparative Example A

Two grams of a chlorinated maleated polypropylene resin, having a chlorine content of 30 wt. % and prepared by the solution chlorination of a maleic anhydride grafted propylene/ethylene copolymer containing 4 wt. % ethylene and 1.0 wt. % grafted maleic anhydride units, was dissolved in 48 grams of toluene. This primer solution was then drawn down onto each of eight 4×6×0.125 inch (10.2×15.2×0.3 cm) TENITE® V-525 polypropylene test plaques, which were prepared by pre-washing the surface with toluene, using a 5 mil (0.13 mm) draw down blade. The plaques were maintained at room temperature for 30 minutes to allow for complete evaporation of the toluene. DUPONT GX-764 ® polyester/melamine elastomeric primer was coated onto the primed plaques using the same 5 mil (0.13mm) draw-down blade. The coated plaques were maintained at room temperature for 30 minutes to allow for evaporation of the solvents. The multi-layer coated polypropylene plaques were then placed in a hot air oven at 120° C. for 30 minutes. After cooling at room temperature, the eight plaques were analyzed in the following manner for wet and dry adhesion performance and gasoline resistance. Four plaques were tested for adhesion performance using a cross-hatch tape pull method. A six-toothed scribe [Model P-A-T Paint Adhesion Tester PA-2057 3 mm grid] was used to create a 25 grid cross-hatch on the surface of the elastomeric primer and Scotch Brand ® 600 tape was used to test the adhesion in the area of the cross-hatch by [1] firmly adhering the tape over the cross-hatch area and then [2] rapidly pulling upwards, at a 180° angle to the plaque surface. Performance was measured by the number of grids remaining after the tape pull. The same four plaques were then immersed in a 100° F. (38° C.) water bath for 72 hours. The plaques were allowed to dry for 12 hours. They were then tested for cross-hatch tape adhesion, as described above. The second set of four plaques were tested for gasoline resistance using the following procedure. The edges of each plaque were sealed using a strip of 7.5 mil (0.20 mm) lead foil tape. The plaques were then immersed in a 50/50 mixture of toluene/heptane to a depth of 2½ inches (6.4 cm). The plaques were removed from the test solution when the immersed coated surface became lifted and wrinkled, and the total immersion time was recorded. Results are shown in Table I.

Example 1

Two grams of a chlorosulfonated maleated polypropylene resin, having a chlorine content of 19.4 wt. % and a sulfur content of 1.3 wt. % and prepared by solution chlorosulfonation of a maleic anhydride grafted propylene/ethylene copolymer containing 4 wt. % ethylene and 1 wt. % grafted maleic anhydride units, was dissolved in 48 grams of toluene. This primer solution was then drawn down onto eight 4×6×0.125 inch (10.2×15.2×0.3 cm) TENITE ® V-525 polypropylene test plaques, which had been prepared as described in Comparative Example A, using a 5 mil (0.13 mm) drawdown blade. Using the procedure described in Comparative Example A, eight multilayer plaques coated with polyester/melamine elastomeric primer were prepared, dried, and cured. The plaques were analyzed for wet and dry adhesion performance as well as gasoline resistance using the techniques described in Comparative Example A. Results are shown in TABLE I.

Comparative Example B

Two grams of a chlorinated maleated polypropylene resin, having a chlorine content of 30 wt. % and prepared by solution chlorination of a maleic anhydride grafted propylene/ethylene copolymer containing 4 wt. % ethylene and 1.0 wt. % grafted maleic anhydride units, were dissolved in 48 grams of toluene. Using the method described in Comparative Example A this primer solution was drawn down onto eight 4×6×0.125 inch (10.2×15.2×0.3 cm) TENITE ® V-525 polypropylene test plaques, the solvent was evaporated, and the plaques were coated with PPG-EHSE ® polyester elastomeric primer. The plaques were maintained at room temperature for 30 minutes to allow for evaporation of the solvents and the multilayer coated polypropylene plaques were placed in a hot air oven at 120° C. for 30 minutes. Results for wet and dry adhesion performance and gasoline resistance are shown in Table I.

Example 2

Two grams of a chlorosulfonated maleated polypropylene resin, having a chlorine content of 28.42 wt. % and a sulfur content of 1.22 wt. % and prepared by the solution chlorosulfonation of a maleic anhydride grafted propylene/ethylene copolymer containing 4 wt. % ethylene and 1.0 wt. % grafted maleic anhydride units, were dissolved in 48 grams of toluene. Using the same technique as described in Comparative Example A, eight polypropylene plaques were coated with the chlorosulfonated primer solution, the plaques were dried, and the plaques were then coated with PPG-EHSE ® polyester elastomeric primer. The coated plaques were dried and cured as described in Comparative Example A. Results of the wet and dry adhesion tests and the test for gasoline resistance are shown in Table I.

Comparative Example C

Two grams, 0.001 equiv. sulfur, of a chlorosulfonated maleated polypropylene resin having a chlorine content of 22.0 wt. % and a sulfur content of 1.4 wt. % and prepared by the solution chlorosulfonation of a maleic anhydride grafted propylene/ethylene copolymer containing 4 wt. % ethylene and 1.0 wt. % grafted maleic anhydride units, were dissolved in 38 grams of toluene. The toluene solution was then rapidly added to a solution of 1.5 grams, 0.01 equivalents, of isophorone diamine dissolved in 10 grams of toluene. This primer solution was then drawn down onto eight 4×6×0.125 inch (10.2×15.2×0.3 cm) TENITE ® V-525 polypropylene test plaques, treated as described in Comparative Example A, using a 5 mil (0.13 mm) drawdown blade. In less than five minutes, the coating solution had gelled. The plaques were maintained at room temperature for 30 minutes to allow for complete evaporation of the toluene. The polyester primer coating of Example 2 was coated onto the primed plaques, as described in Comparative Example A. The coated plaques were dried and cured as described in Comparative Example A. Results of the tests for wet and dry adhesion and gasoline resistance are shown in Table I.

Comparative Example D

Two grams, 0.001 equivalents sulfur, of the chlorosulfonated maleated polypropylene resin of Comparative Example C and 0.4 grams of litharge (T/HRL-D90 lead maleate dispersion) were dissolved in 47.6 grams of toluene. This primer solution was drawn down onto eight 4×6×0.125 inch (10.2×15.2×0.3 cm) TENITE ® V-525 polypropylene test plaques, treated as described in Comparative Example A, using a 5 mil drawdown blade. The plaques were maintained at room temperature for 30 minutes to allow for complete evaporation of the toluene. The polyester primer coating of Example 2 was coated onto the primed plaques, as described in Comparative Example A. The coated plaques were dried and cured as described in Comparative Example A. Results of the tests for wet and dry, adhesion and gasoline resistance are shown in Table I.

Comparative Example E

Two grams of a chlorinated maleated polypropylene resin having a chlorine content of 30% by weight, prepared by solution chlorination of a maleic anhydride grafted propylene/ethylene copolymer containing 4 wt. % ethylene and 1.0 wt. % grafted maleic anhydride units, and five grams of p-toluene sulfonyl chloride containing 25 wt. % sulfur, were dissolved in 43 grams of toluene. This primer solution was then drawn down onto eight 4×6×0.125 inch (10.2×15.2×0.3 cm) TENITE ® V-525 polypropylene test plaques, treated as described in Comparative Example A, using a 5 mil (0.13 mm) drawdown blade. The plaques were maintained at room temperature for 30 minutes to allow for complete evaporation of the toluene. DUPONT GX-764 ® polyester/melamine elastomeric primer was coated onto the primed plaques using the techniques of Comparative Example A. The plaques were dried, cured, and tested as described in Comparative Example A. Results are shown in Table I.

Example 3

Two grams of a chlorinated maleated polypropylene resin having a chlorine content of 30% by weight and prepared by solution chlorination of a maleic anhydride grafted propylene/ethylene copolymer containing 4 wt. % ethylene and 1.0 wt. % grafted maleic anhydride units, and two grams of a chlorosulfonated polyethylene having a chlorine content of 55 wt. % and a sulfur content of 1.8 wt. %, prepared by solution chlorosulfonation of a low molecular weight polyethylene having a weight average molecular weight of 5,000, were dissolved in 46 grams of toluene. This primer solution was then drawn down onto a eight 4×6×0.125 inch (10.2×15.2×0.3 cm) TENITE ® V-525 polypropylene test plaques prepared as described in Comparative Example A, using a 5 mil (0.13 mm) drawdown blade. The plaques were maintained at room temperature for 30 minutes to allow for complete evaporation of the toluene. DUPONT GX-764 ® polyester/melamine elastomeric primer was coated onto the primed plaques using the techniques of Comparative Example A. The plaques were dried, cured, and tested as described in Comparative Example A. Results are shown in Table I.

Comparative Example F

Two grams of the chlorinated maleated polypropylene resin used in Example 3 and three grams of a chlorinated polyethylene having a chlorine content of 64 wt. %, prepared by solution chlorination of a low molecular weight polyethylene (density 0.920 g/cc, weight average molecular weight of 5,000) were dissolved in 45 grams of toluene. This primer solution was then drawn down onto eight 4×6×0.125 inch (10.2×15.2×0.3 cm) TENITE ® V-525 polypropylene test plaques, prepared as described in Comparative Example A, using a 5 mil (0.13 mm) drawdown blade. The plaques were maintained at room temperature for 30 minutes to allow for complete evaporation of the toluene. DUPONT GX-764 ® polyester/melamine elastomeric primer was coated onto the primed plaques using the techniques of Comparative Example A. The plaques were dried, cured, and tested as described in Comparative Example A. Results are shown in Table I.

Example 4

An aqueous polymer dispersion was prepared by mixing a) 5 g distilled water, and b) 5 g of a chlorosulfonated maleated polypropylene resin dispersion, prepared by dissolving 30 g of a chlorosulfonated maleated polypropylene/ethylene copolymer (base resin before chlorosulfonatation containing 4 wt. % ethylene, and 1.0 wt. % grafted maleic anhydride units) having a chlorine content of 22.0 wt. % and a sulfur content of 1.4 wt. %. This polymer dispersion and 30 g toluene were mixed and subjected to high shear mixing conditions in the presence of a non-ionic surfactant. The toluene was then removed by vacuum distillation, yielding a 37.5% solids primer dispersion. The primer dispersion was then drawn down onto eight 4×6×0.125 inch (10.2×15.2×0.3 cm) TENITE ® V-525 polypropylene test plaques, prepared as described in Comparative Example A, using a 5 mil (0.13 mm) drawdown blade. The plaques were maintained at room temperature for 30 minutes to allow for complete evaporation of the toluene. DUPONT GX-764 ® polyester/melamine elastomeric primer was coated onto the primed plaques using the techniques of Comparative Example A. The plaques were dried, cured, and tested as described in Comparative Example A. Results are shown in Table I.

TABLE I

| Example | Dry Adhesion (Grids Remaining) | Wet Adhesion (Grids Remaining) | Gas Resistance (Minutes) |
|---|---|---|---|
| Comparative Example A | 25 | 25 | 3 |
| Example 1 | 25 | 25 | 120 |
| Comparative Example B | 25 | 25 | 4 |
| Example 2 | 25 | 25 | 110 |
| Comparative Example C | 20[1] | 14[1] | 120 |
| Comparative Example D | 25 | 25 | 16 |
| Comparative Example E | 25 | 25 | 2 |
| Example 3 | 25 | 25 | 120 |
| Comparative Example F | 25 | 25 | 9 |
| Example 4 | 25 | 25 | 120 |

[1]Delamination occurred between the primer layer and the coating layer.

I claim:

1. A curable multilayer coated substrate which comprises
    A) a first plastic substrate layer;
    B) a second layer, in contact with the plastic layer and substantially free of crosslinking agents for chlorosulfonated olefin polymers, which comprises a chlorosulfonated polypropylene homopolymer or copolymer having a suitor content of at least 0.5 weight percent and a chlorine content of 10–45 weight percent which has been graft-modified with a grafting agent selected from the group consisting of alpha, beta-unsaturated dicarboxylic acids and anhydrides thereof; and
    C) a third layer, in contact with the second layer, comprising a polymer having free hydroxyl, primary amino, or secondary amino moieties.

2. A coated substrate of claim 1 wherein the graft-modified chlorosulfonated olefin polymer is chlorosulfonated, maleated polypropylene.

3. A coated substrate of claim 1 wherein the graft-modified chlorosulfonated olefin polymer is a chlorosulfonated, maleated copolymer of ethylene and propylene.

4. A coated substrate of claim 1 wherein the polymer of the third layer is a polyester melamine resin.

5. A cured coated substrate of claim 1.

6. A curable multilayer coated substrate which comprises
    A) a first plastic substrate layer;
    B) a second layer in contact with the plastic layer and substantially free of crosslinking agents for chlorosulfonated olefin polymers, which comprises a blend of i) a chlorosulfonated olefin polymer having a sulfur content of at least 0.5 weight percent and a chlorine content of 20–65 weight percent and ii) a chlorinated polypropylene, free of chlorosulfonyl groups, having a chlorine content of 20–55 weight percent, which has been graft-modified with a grafting agent selected from the group consisting of alpha, beta-unsaturated dicarboxylic acids and anhydrides thereof; wherein component i) is present in an amount of 5–50 parts per 100 pans combined i) and ii), and component ii) is present in an amount of 50–95 parts per 100 parts combined i) and ii); and
    C) a third layer, in contact with the second layer, comprising a polymer having free hydroxyl, primary amino, or secondary amino moieties.

7. A coated substrate of claim 5 wherein the graft-modified chlorinated polypropylene is chlorinated, maleated polypropylene.

8. A coated substrate of claim 5 wherein the graft-modified chlorinated polypropylene is a chlorinated, maleated copolymer of ethylene and propylene.

9. A coated substrate of claim 5 wherein the polymer of the third layer is a polyester melamine resin.

10. A cured coated substrate of claim 6.

* * * * *

UNITED STATES PATENT AND TRADEMARK OFFICE
CERTIFICATE OF CORRECTION

PATENT NO. : 5,436,079
DATED : July 25, 1995
INVENTOR(S) : Edward G. Brugel It is certified that error appears in the above-identified patent and that said Letters Patent is hereby corrected as shown below:

Column 10, line 21, change "suitor" to read -- sulfur --.

Column 10, line 52, change "pans" to read -- parts --.

Signed and Sealed this

Twenty-first Day of May, 1996

*Attest:*

BRUCE LEHMAN

*Attesting Officer*  *Commissioner of Patents and Trademarks*